(12) United States Patent
Spangenberg et al.

(10) Patent No.: US 6,279,565 B1
(45) Date of Patent: Aug. 28, 2001

(54) ARTICULATED LOCK FOR A SAW ROPE

(75) Inventors: Rolf Spangenberg, Gauting (DE); Josef Plattner, Gallzein (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/814,150

(22) Filed: Mar. 21, 2001

(30) Foreign Application Priority Data

Mar. 27, 2000 (DE) .............................................. 100 15 182

(51) Int. Cl.[7] .................................................. B28D 1/08
(52) U.S. Cl. ................................................. 125/21; 125/12
(58) Field of Search ................................... 125/12, 13.01, 125/21, 22, 18, 15; 83/697, 651.1; 451/296

(56) References Cited

U.S. PATENT DOCUMENTS

| | | | |
|---|---|---|---|
| 3,598,101 | * 8/1971 | Hensley | 125/21 |
| 4,936,284 | * 6/1990 | Johnson | 125/21 |
| 5,216,999 | * 6/1993 | Han | 125/21 |

* cited by examiner

Primary Examiner—Derris H. Banks
(74) Attorney, Agent, or Firm—Sidley Austin Brown & Wood, LLP

(57) ABSTRACT

An articulated lock for a saw rope (5) and including a first articulated member (1; 21) having a sleeve-shaped region for receiving an end of the rope (5) and a connection region (6; 26) formed of two, spaced from each other cheeks (7, 8; 27, 28), a second articulated member (2; 22) having a sleeve-shaped region for receiving another end of the rope (5), and a connection region (9; 29) formed as an eye-shaped portion and extending into a space defined by the two cheeks (7, 8; 27, 28) of the connection region of the first articulated member (1; 21); and a joining bolt (10; 30) extending through the bores (11; 31) formed in the two cheeks (7, 8; 27, 28) and the through-opening (12; 32) formed in the eye-shaped portion for pivotally connecting the first and second articulated members (1, 2; 21, 22) with each other, with the through-opening (12; 32) of the eye-shaped portion having at least in a region of the opposite side surfaces (13; 33) of the eye-shaped portion, a diameter exceeding the diameter of the joining bolt.

8 Claims, 4 Drawing Sheets

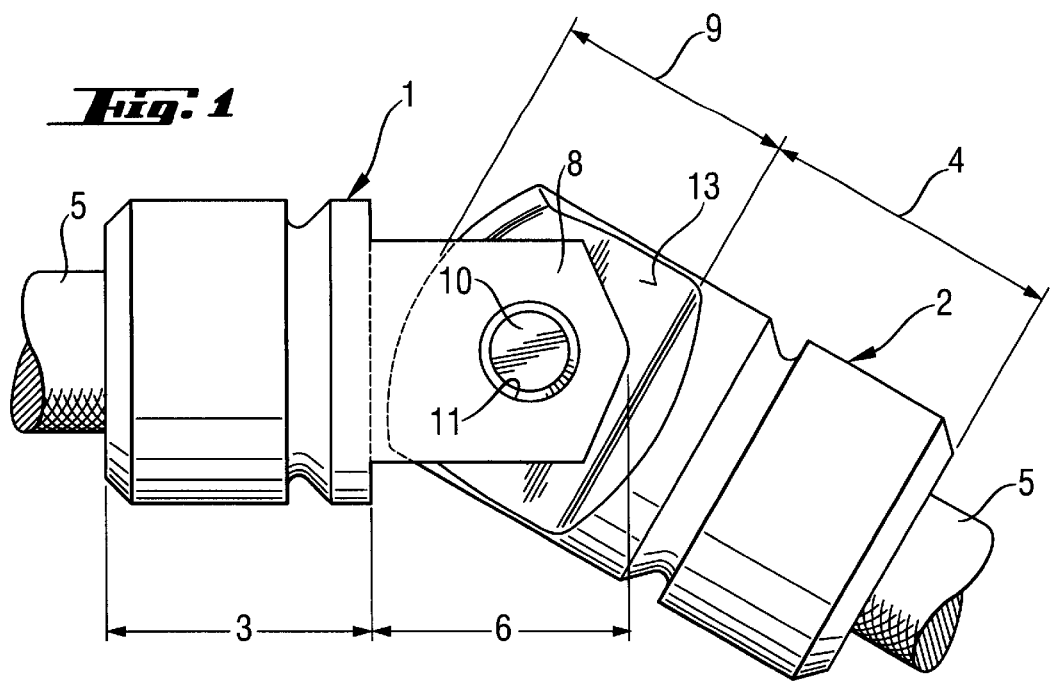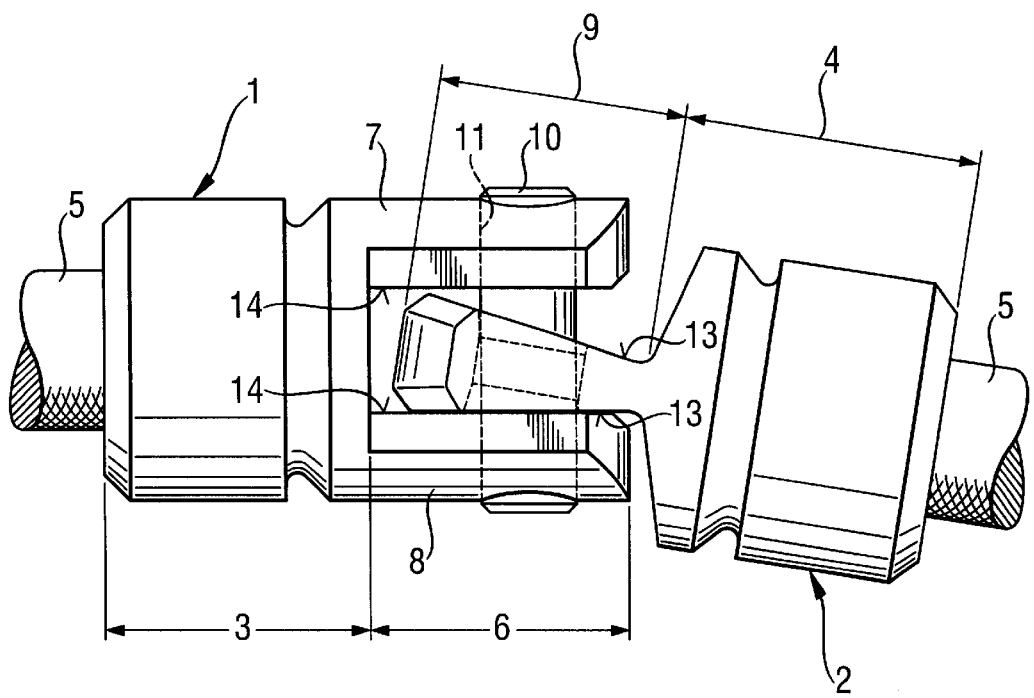

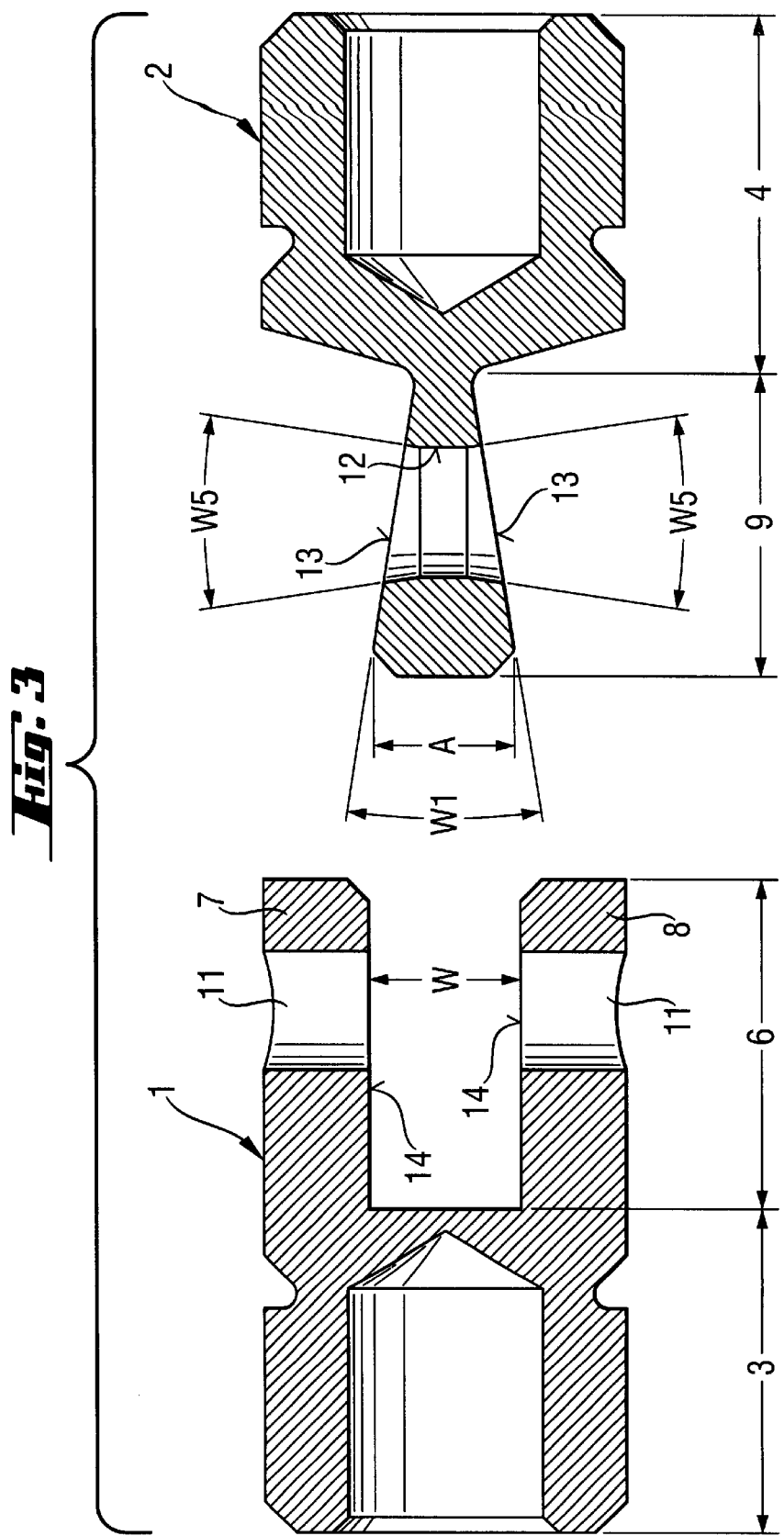

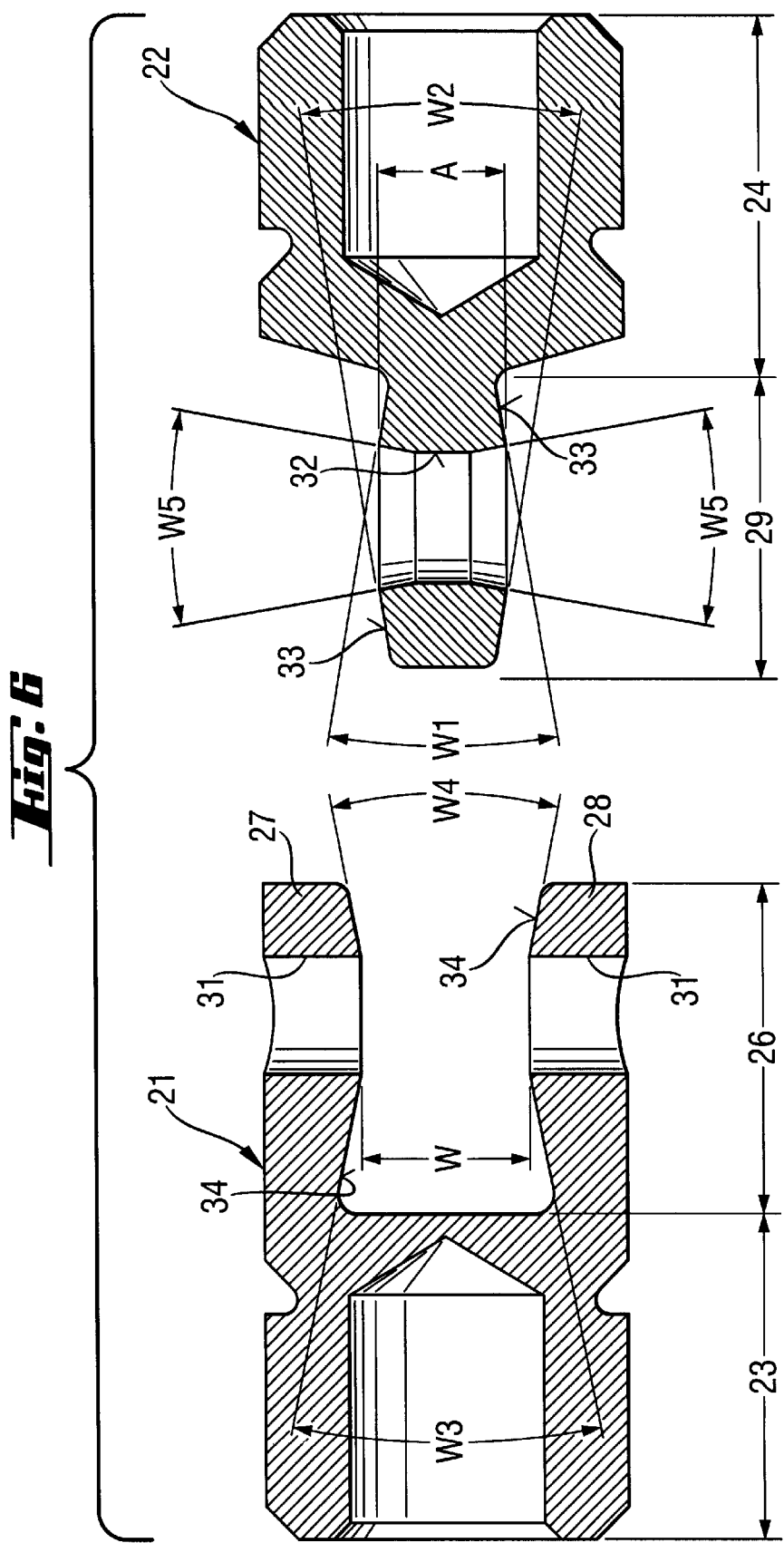

ARTICULATED LOCK FOR A SAW ROPE

BACKGROUND OF THE INVENTION

1. Field of the Invention

The present invention relates to an articulated lock for a saw rope and including a first articulated member having a sleeve-shaped region for receiving an end of the rope and a connection region formed of two, spaced from each other cheeks having coaxial bores, a common axis of which extends perpendicular to a longitudinal extent of the first articulated member, a second articulated member having a sleeve-shaped region for receiving another end of the rope, and a connection region having a through-opening and connectable with the connection region of the first articulated member, and joining bolt means for pivotally connecting the first and second articulated members.

2. Description of the Prior Art

For cutting of natural or virgin stone, brickwork, reinforced concrete, and the like or for treating of precise profiles, sawing ropes, which are provided in rope saws, are used. For guiding a sawing or a saw rope in and outside of a rope saw, deflection or guide rollers are used, with the rollers being provided with an outer profile corresponding to the rope. The saw rope is formed of a steel cable, a plurality of cutting beads formed of diamond cutting grains and distributed over the steel cable, and an articulated lock which connects the opposite ends of the saw rope with each other. The saw rope, the cutting edges of which have a circular outer profile, bends during treating of constructional component, which results in rotation of the entire rope about its axis. The advantage of this rotation consists in that the outer profile of the cutting beads wears substantially uniformly. In order for the rope to be guided about the deflection rollers well and reliably also in the region of the articulated lock, the lock includes, e.g., two articulated members with two articulated axes crossing each other at an angle of 90°. Because of this, the two articulated members can rotate or pivot in opposite directions upon rotation of the rope by 90°. A saw rope of the type described above is disclosed in EP-680395B1.

Each of the two articulated members has a fork-shaped receiving region with two cheeks and has a sleeve-shaped receiving region fixedly connected with a saw rope end. The two articulated axes are formed by two joining bolts which extend through respective cheeks of the articulated members and respective bores of an intermediate member that projects into the space between the two cheeks of both articulated members. Because of the two articulated axes arranged one after another in the longitudinal direction of the articulated lock, the lock has a large length. In addition, the lock is formed of a comparatively large number of parts and has a relatively large weight.

Accordingly, an object of the present invention is to provide an articulated lock having a reduced length and a reduced weight.

Another object of the present invention is to provide an articulated lock that can be economically produced and that insures a reliable connection of the two ends of the saw rope.

SUMMARY OF THE INVENTION

These and other objects of the present invention, which will become apparent hereinafter, are achieved by forming the connection region of the second articulated member as an eye-shaped section and by providing in this section or portion a through-opening the diameter of which exceeds the diameter of the joining bolt at least in the region of the opposite, spaced from each other, side surfaces of the eye-shaped portion.

The articulated lock according to the present invention has two articulated members pivotally connected with each other by a single joining bolt. Each of the two articulated members has a sleeve-shaped receiving region which is fixedly connectable with a saw rope end. Both articulated members are pivotable about two articulated axes or in two planes in opposite directions, with the axes or planes being arranged relative to each other at an angle of 90°. The first axis is defined by the axis of the joining bolt. Thus, the two articulated members are pivotable in opposite directions in a first plane which extends perpendicular to the axis of the joining bolt. Due to a particular shape of the through-opening of the connection region of the second articulated member, the second articulated member can rotate in a second plane in which the axis of the joining bolt is located.

The particular shape of the second articulated member insures a very short length of the entire lock. The inventive articulated lock can be economically produced and has a reduced weight as it is formed only of few, easily formed, components.

In order to provide for a reliable pivotal movement of the second articulated member relative to the first articulated member in the plane in which the axis of the joining bolt is located, the distance between the two side surfaces of the eye-shaped portion, which is measured parallel to the axis of the through-opening formed in the eye-shaped portion, diminishes toward the receiving region and/or the free end of the connection region. Preferably, the largest distance between the two side surfaces corresponds to a width between the inner surfaces of the two cheeks of the first articulated member.

A good abutment and guiding of the saw rope over the outer profiles of the deflection rollers is advantageously achieved when the side surfaces of the eye-shaped portion or at least their sections form with each other an angle from 5° to 20°, preferably an angle of 15°. With respect to the longitudinal axis of the second articulated member, the angle, at which the side surfaces extend thereto, is the same on both sides. It is, of course, possible to provide side surfaces that would extend to the longitudinal axis of the second articulated member at different angles.

In order to form both articulated members of the lock so that they can be guided over the outer profiles of the deflection rollers, which serve for guiding the rope, the articulated members are so shaped that they can slightly rotate in opposite directions in a circumferential direction. This relative rotation is achieved by reducing the distance between the two side surfaces, in a direction perpendicular to the axis of the through-opening and the longitudinal axis of the receiving region, toward the outer profile of the second articulated member.

Advantageously, the width between the inner surfaces of the two, spaced from each other cheeks of the first articulated member increases toward the receiving region of the first articulated member and/or toward the free end of the receiving, fork-shaped region of the first articulated member. Thereby, a reliable pivotal movement of the second articulated member relative to the first articulated member in the plane of the axis of the joining bolt is achieved. With this shape of the cheeks, the inclination of the side surfaces of the connection region of the second articulated member toward its longitudinal axis can be dispensed with, and they can be so formed that the distance therebetween remains the same over the entire length of the side surfaces.

An angle, over which the second articulated member rotates relative to the first articulated member in the plane of the axis of the joining bolt, depends on inclination of the inner surfaces of the cheeks relative to the longitudinal axis of the first articulated member.

Advantageously, the inner surfaces of the cheeks or at least the sections of the inner surfaces form with each other an angle from 5° to 20°.

In order to adapt both articulated members of the lock so that they can be guided over the outer profiles of the deflection rollers, which serve for guiding the rope, the articulated members are so shaped that they can slightly rotate in opposite directions in a circumferential direction. This relative rotation is achieved by increasing the width between the two inner surfaces of the cheeks, in a direction perpendicular to the axis of the bores and the longitudinal axis of the receiving region, toward the outer profile of the first articulated member.

The pivotal movement of the connection region of the second articulated member with respect to the joining bolt is additionally improved when the diameter of the through-opening of the connection region increases toward both side surfaces.

Generally, the largest distance between the side surfaces of the eye-shaped portion of the second articulated member corresponds to the smallest width between the inner surfaces of the two cheeks of the connection region of the first articulated member.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 1 a side view of a first embodiment of an articulated lock for a rope of a rope saw according to the present invention;

FIG. 2 a plan view of the articulated lock shown in FIG. 1;

FIG. 3 a cross-sectional view of the articulated members of the articulated lock shown in FIG. 1, without the rope and without the joint bolt;

FIG. 6 a cross-sectional view of the articulated members of the articulated lock shown in FIG. 4, without the rope and without the joint bolt.

DETAILED DESCRIPTION OF THE PREFERRED EMBODIMENT

Figure 4:
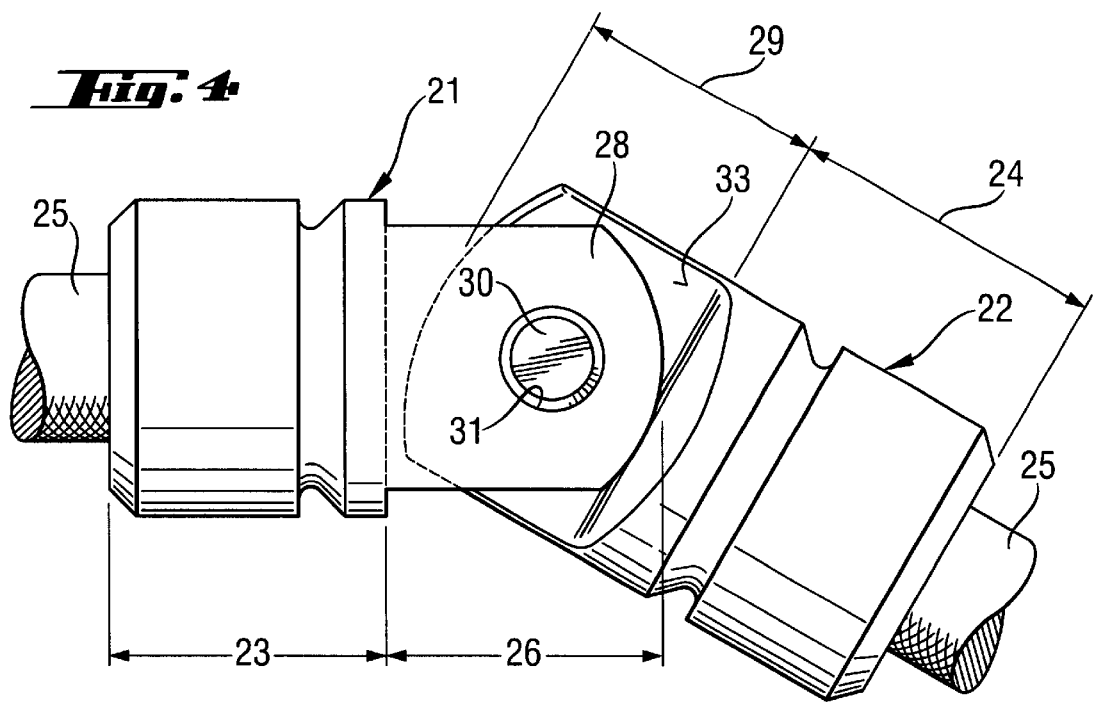
FIG. 4 a side view of a second embodiment of an articulated lock for a rope of a rope saw according to the present invention.

FIGS. 1–6 show two embodiments of an articulated lock for a saw rope 5; 25 according to the present invention which has two articulated members 1, 2; 21, 22 which are pivotally connected with each other by a joint bolt 10;30, respectively.

The first articulated member of each lock has, in its first free region, a receiving region 3; 23 with a receiving sleeve in which the first free end of a rope 5; 25 is received. At the second end region opposite the receiving region 3; 23, the first articulated member 1; 21 is provided with a fork-shaped region 6; 26 having two spaced from each other cheeks 7, 8; 27, 28. As it is particularly shown in FIGS. 3 and 6, both cheeks 7, 8; 27, 28 of the first articulated member 1; 21 have each a bore 11; 31 for receiving the joining bolt 10; 30 as shown in FIGS. 1–2 and 4–5. The joining bolt 10; 30 has a diameter corresponding to the diameters of the bores 11; 31. A free end of the joining bolt 10; 30 is provided, e.g., with a surface profile which permits to achieve particularly good holding values when the bolt 10; 30 is received in bores 11; 31.

The bolt 10; 30 extends through an opening 12; 32 which is provided in the connection region 9; 29 of the second articulated member 2; 22. The connection region 9; 29 is formed integrally with the receiving region 4; 24 of the second articulated member 2; 22. The receiving region 4; 24 has a blind bore in which another free end of the rope 5 is received. The connection of both articulated members 1, 2; 21, 22 with the rope 5; 25 is effected by radial compression of both articulated members 1, 2; 21, 22 in the region of the receiving region of these two articulated members 1, 2; 21, 22.

Two side surfaces 13; 33 of the connection region 9; 29, which are spaced from each other by a distance A, extend substantially transverse to the longitudinal axis of the opening 12; 32. The inner surfaces of the cheeks 7, 8; 27, 28 of the first articulated member 1; 21 are spaced, in the direction of the axis of bores 11; 31, by a distance W which substantially corresponds to the largest distance A of the two surfaces 13; 33.

The central region of the opening 12; 32 in the connection region 9; 29 has a diameter which substantially corresponds to the diameter of the joining bolt 10; 30. Generally, the diameter of the opening 12; 32 widens, from the central region, to both side surfaces 13; 33 by an angle W5 of 15°.

In the articulated lock shown in FIGS. 1–3, the adjacent surfaces 14 of the cheeks 7, 8 extend parallel to each other. The connection region 9 of the second articulated member 2, which extends into the space W limited by the two surfaces 14, has two side surfaces 13, as discussed above. The distance A of two surfaces 13, measured in direction parallel to the axis of the opening 12, diminishes toward the receiving region 4 of the second articulated member 2. Both side surface 13 extend toward each other at angle W1 from 5° to 20°, preferably 15°.

Figure 5:
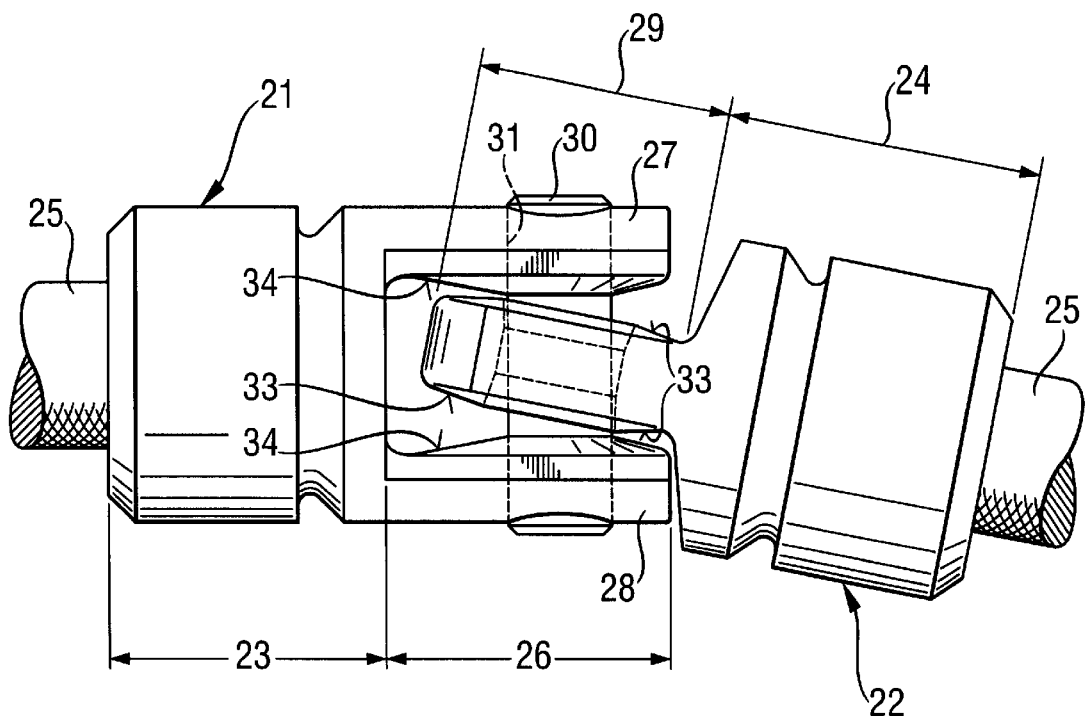
FIG. 5 a plan view of the articulated lock shown in FIG. 4.

The first articulated member 21 of the articulated lock, which is shown in FIGS. 4–6, likewise has two cheeks 27, 28 having inner surfaces 34 facing each other. The surfaces 34 are spaced from each other in the direction parallel to the axis of the bore 31 by a distance W which increases, starting from the center of the bore 31 in opposite directions, toward the receiving region 23 and to the free end of the fork-shaped region 26. The opposite sections of the surfaces 34 form with each other an angle W4 from 5° to 20°, preferably 15°.

The connection region 29 of the first articulated member 21, which projects into the space defined by the distance W, has two side surfaces 33, as it has already been discussed above, and which are spaced from each other, in the direction parallel to the axis of the bore 32, by a distance A. Starting from the center of the opening 32, the distance A diminishes in opposite directions, toward the receiving region 24 and toward the free end of the connection region 29. The opposite end sections of the surfaces 33 form with each other an angle from 5° to 20°, preferably, an angle of 15°.

The distance A between the two side surfaces 13; 33 can diminish, in a direction perpendicular to the axis of the opening 12; 32, toward the outer profile of the articulated member 2; 22. This provides for a small rotation in opposite directions of both articulated members 1, 2; 21, 22 about their respective axis.

The width W between the inner surfaces 14; 34 of the cheeks 7, 8; 27, 28 can increase, starting from the center of the opening 11; 31, in a direction perpendicular to the axis of the opening 11; 31 toward the outer profile of the first articulated member 11; 21. This profile of the inner surfaces 14; 34 provides also for a small rotation in the opposite directions of both articulated members 1, 2; 21, 22 about their axes.

Basically, it is not important that both articulated members 1, 2; 21, 22 have the special profile of the side surfaces 13; 33 and the cheek surfaces 14; 34 shown in FIGS. 4–6. It is quite sufficient when only one of the two articulated members 1, 2; 21, 22 has a special profile, as described above, and the side surfaces 13; 33 and/or cheek surfaces 14; 34 of the other articulated member 1, 2; 21, 22 extend parallel to each other. In this case, the width W between the cheek surfaces 14; 34 and/or the distance A between the side surfaces 13; 33 remains constant.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. An articulated lock for a saw rope (5), comprising a first articulated member (1; 21) having a sleeve-shaped region for receiving an end of the rope (5) and a connection region (6; 26) formed of two, spaced from each other cheeks (7, 8; 27, 28) having coaxial bores (11; 31) a common axis of which extends perpendicular to a longitudinal extent of the first articulated member (1; 21); a second articulated member (2; 22) having a sleeve-shaped region for receiving another end of the rope (5), and a connection region (9; 29) formed as an eye-shaped portion having opposite side surfaces (13; 33) and a through-opening (12; 32) and extending into a space defined by inner, facing each other surfaces (14; 34) of the two cheeks (7, 8; 27, 28) of the connection region of the first articulated member (1; 21); and a joining bolt (10; 30) extending through the bores (11; 31) of the two cheeks (7, 8; 27, 28) and the through-opening (12; 32) of the eye-shaped portion for pivotally connecting the first and second articulated members (1, 2; 21, 22) with each other, the through-opening (12; 32) of the eye-shaped portion having, at least in a region of both side surfaces (13; 33), a diameter exceeding a diameter of the joining bolt.

2. An articulated lock according to claim 1, wherein a distance (A) between the two side surfaces (13; 33), which is measured parallel to an axis of the through-opening (12; 32) diminishes at least toward one of the receiving region (4; 24) and a free end of the connection region of the second articulated member, and wherein a largest distance (A) substantially corresponds to a distance (W) between the inner surfaces (14; 34) of the two cheeks (7, 8; 27, 28) of the first articulated member.

3. An articulated lock according to claim 2, wherein at least end sections of the opposite side surfaces (13; 33) form with each other an angle (W1, W2) from 5° to 15°.

4. An articulated lock according to claim 2, wherein the distance (A) between the two side surfaces (13; 33) diminishes toward an outer profile of the second articulated member (2; 22) in a direction perpendicular to the axis of the through-opening (12; 32).

5. An articulated lock according to claim 1, wherein a width (W) between the inner surfaces (34) of the two cheeks (27; 28) of the first articulated member (21) increases toward at least one of the receiving region (23) and the free end of the connection region (26).

6. An articulated lock according to claim 5, wherein at least sections of the inner surfaces (34) form with each other an angle (W3, W4) from 5° to 20°.

7. An articulated lock according to claim 1, wherein a width (W) between the inner surfaces (14; 34) of the two cheeks (7, 8; 27, 28) increases toward an outer profile of the first articulated member (1; 21) in a direction perpendicular to the common axis of the bores (11; 31) formed in the cheeks.

8. An articulated lock according to claim 1, wherein the diameter of the through-opening (12; 32) increases toward the side surfaces (13; 33).

* * * * *